United States Patent [19]

Bailey

[11] Patent Number: 5,019,780
[45] Date of Patent: May 28, 1991

[54] METHOD AND APPARATUS FOR MONITORING OPTICAL FIBERS DURING PAYOUT

[75] Inventor: Wilbur M. Bailey, Tucson, Ariz.

[73] Assignee: Hughes Aircraft Company, Los Angeles, Calif.

[21] Appl. No.: 425,645

[22] Filed: Oct. 23, 1989

[51] Int. Cl.[5] .............................................. G01R 29/12
[52] U.S. Cl. ................................... 324/457; 324/452; 324/72; 340/677
[58] Field of Search ................ 324/452, 454, 457, 72, 324/72.5; 340/677; 73/159, 160; 350/96.23; 57/264, 265; 424/158 R, 54 R; 250/571

[56] References Cited

U.S. PATENT DOCUMENTS 3,885,161  5/1975  Tarbox et al. ........................ 250/571
4,027,232  5/1977  Domig et al. ........................ 324/454
4,438,402  3/1984  Cullen et al. ........................ 324/457

Primary Examiner—Kenneth Wieder
Assistant Examiner—Jack B. Harvey
Attorney, Agent, or Firm—R. M. Heald; C. D. Brown; W. K. Denson-Low

[57] ABSTRACT

The turns of an optical fiber paid out from a canistor are counted, and the signature of the optical fiber is measured, by monitoring the electromagnetic field of the charge on the optical fiber as it moves past an antenna. The optical fiber follows a helical path as it is paid out. A stationary antenna located transversely proximate the payout region detects a periodic repeating variation of the bound and/or free electrical charge associated with the optical fiber, as the optical fiber periodically moves closer to and farther from the antenna along the helical path. Each period of the variation corresponds to one turn of optical fiber paid out from the canister.

19 Claims, 2 Drawing Sheets

METHOD AND APPARATUS FOR MONITORING OPTICAL FIBERS DURING PAYOUT

BACKGROUND OF THE INVENTION

This invention relates to the measurement of optical fiber characteristic during payout of the optical fiber from a support, and, more particularly, to the measurement of the electromagnetic field of the optical fiber during payout.

Optical fibers are strands of glass fiber processed so that light transmitted therethrough is subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a highly plentiful substance, silicon dioxide.

Glass fibers are fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in one configuration the diameter of the glass optical fiber is about 125 micrometers, and the diameter of the fiber plus the polymer buffer is about 250 micrometers (approximately 0.010 inches).

For such very fine fibers, the handling of the optical fiber to avoid damage that might reduce its light transmission properties becomes an important consideration. The fibers are typically wound onto a cylindrical or truncated conical bobbin with many turns adjacent to each other in a side-by-side fashion. After one layer is complete, another layer of fiber is laid on top of the first layer, and so on. An adhesive is applied to the layers to hold them in place on the canister, and to control the payout of the optical fiber to avoid snarls and breaks that might result from payout of multiple turns at once. The final assembly of the bobbin and the wound layers of fiber is termed a canister, and the mass of wound fiber is termed the fiber pack. When the optical fiber is later to be used, the fiber is paid out from the canister in a direction parallel to the axis of the cylinder.

One basic problem during the payout of the optical fiber from the canister is the measurement of the amount of optical that has been paid out. The optical fiber may be paid out at rates as high as several hundred meters per second. Mechanical gauges are not practical because contact of anything to the fiber may damage it. Various types of optical sensors have been tried. These gauges utilize light sources and detectors that detect the optical fiber operating on the principle of interruption of the light beam, reflection, or refraction. These gauges are often bulky, require considerable power, are sensitive to stray light and reflections, and may be inaccurate if gauge placement and calibration are not extremely precise.

There exists a need for an approach for accurately measuring an optical fiber as it is payed out from a canister at rates as high as several hundred meters per second. The apparatus used to do the measurement should ideally consume little power, be accurate, and be compact. The present invention fulfills this need, and further provides related advantages.

SUMMARY OF THE INVENTION

The present invention provides a light weight, compact, low power consumption approach for measuring an optical fiber as it is paid out from a canister. Two particularly preferred applications of the approach are the counting of turns of the optical fiber as the turns are paid out, to give a measurement of the total amount of optical fiber paid out and the rate of payout, and the recording of the signature of the optical fiber. The apparatus is not sensitive to small placement errors. It is highly accurate, even when slightly misplaced from its intended position. The approach may be used both during optical fiber canister payout tests, and during actual field use of the optical fiber.

In accordance with the invention, a process for measuring an optical fiber as the optical fiber is payed out from a support comprises the steps of providing a support having an optical fiber wound in turns thereupon; paying out the optical fiber from the support; and measuring the electromagnetic field produced by the optical fiber as it is paid out.

The optical fiber is a dielectric, but carries an electrical charge as it is a payed out from the support, which is typically a canister upon which a fiber pack is wound. The charge probably originates as the adhesive bonds are broken during payout and from friction, but its origin is not critical. Because the optical fiber does not conduct the electrical charge readily, the charge is stationary for at least a short time after payout.

Payout of the optical fiber from the support normally involves side-to-side or transverse movement of the optical fiber, as well as longitudinal movement of the optical fiber. In the case of payout of the optical fiber from a canister, the primary component of the movement of the optical fiber during payout is in the longitudinal direction parallel to the cylindrical axis of the canister. However, since the optical fiber is being unwound from the support generally parallel to the axis of the support, the payout necessarily involves a helical pattern involving transverse motion of the optical fiber in the region adjacent the canister, where the optical fiber has just left the canister. Further away from the canister, the transverse component of the motion of the optical fiber essentially disappears, and there is only the longitudinal motion.

In one approach to measuring the optical fiber as it is payed out, an electromagnetic field antenna is placed transversely proximate the region of the paid out optical fiber where the path of the optical fiber has a component of periodically varying transverse motion. The position of the optical fiber periodically moves closer to, and farther from, the antenna as payout continues due to the helical path and associated lateral movement. The electromagnetic field of the electrical charge on the optical fiber as measured at the antenna therefore varies periodically. One period of the variation corresponds to the payout of one turn of the optical fiber. The number of turns paid out from the support is measured by counting the periodic variations in the signal received by the antenna.

The properties or characteristics of the optical fiber that may be measured by this approach are, of course, not limited to the counting of turns. For example, the entire pattern of the electromagnetic signal over large number of turns constituting multiple layers of optical fiber may be measured as the "signature" of the optical fiber. The signature is dependent upon the physical characteristics of the fiber pack such as the quantity of adhesive used to hold the turns in place. Measurement of the signature aids in developing improved adhesive and adhesive application systems.

To conduct such measurements of the optical fiber, the electromagnetic field antenna is placed transversely proximate the region of the optical fiber where its motion has a lateral component. The antenna preferably is disposed off-axis, that is, not placed along the centerline of the optical fiber canister, as there is no relative transverse movement of the optical fiber with respect to the centerline location. The antenna also is preferably not placed at a location that moves with the same period as the helical motion of the fiber, so that there would be no relative transverse motion between the optical fiber and the antenna.

In the most preferred approach, the antenna is a straight wire antenna whose axis is parallel to the payout direction. The antenna is mounted stationary on a support outside the helical path, to detect the field of the change on the optical fiber as the transverse position of the optical fiber varies periodically. The measurement of the electromagnetic field produced by the charge on the optical fiber depends only upon the transverse motion of the optical fiber, and not upon exact placement of the antenna.

The present approach is highly versatile, and can utilize virtually any configuration of antenna. The straight wire antenna is satisfactory for measurement of the periodic signal variation to count turns as they are paid out and measurement of the overall signature of the optical fiber. The approach can be used in stationary testing of canister payout, and also in a moving vehicle from which the optical fiber is payed out. In the latter case, the antenna signal can be sent down the optical fiber to a control center, where the counting instrumentation is located. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

In accordance with the invention, a process for measuring an optical fiber as it is payed out from a canister comprises the steps of providing a canister having an optical fiber pack wound thereupon, the optical fiber to be payed out axially from the canister along a payout path so that the optical fiber follows a helical pattern with a transverse component of motion along the portion of the payout path; and placing an electromagnetic field antenna transversely proximate the portion of the payout path where the optical fiber has the transverse component of motion, to detect changes in the electromagnetic field produced by the optical fiber as the optical fiber is payed out.

The invention also includes an apparatus for accomplishing the measurements. In accordance with this aspect of the invention, apparatus for measuring an optical fiber as it is payed out axially from a support along an optical fiber path comprises an electromagnetic field antenna located transversely proximate the portion of the optical fiber path where the optical fiber has a transverse component of motion during payout.

In one preferred embodiment of the invention, the turns of optical fiber are counted as they are paid out. In accordance with this embodiment, a process for counting the turns of an optical fiber payed out from a canister comprises the steps of providing a generally cylindrical canister having a plurality of turns of an optical fiber wound thereupon, the optical fiber to be paid out axially from a payout end of the canister; placing an electromagnetic field antenna proximate the portion of the payout path where the optical fiber assumes a helical pattern during payout; paying out the optical fiber; measuring the electromagnetic signal detected by the electromagnetic field antenna as the optical fiber is paid out; and counting the number of periodic fluctuations in the signal measured by the electromagnetic field antenna as the optical fiber is paid out, each fluctuation being associated with the payout of one turn of the optical fiber. In another preferred embodiment, the long term pattern of the measured signal is recorded and reviewed to assess the signature of the optical fiber.

Figure 1:
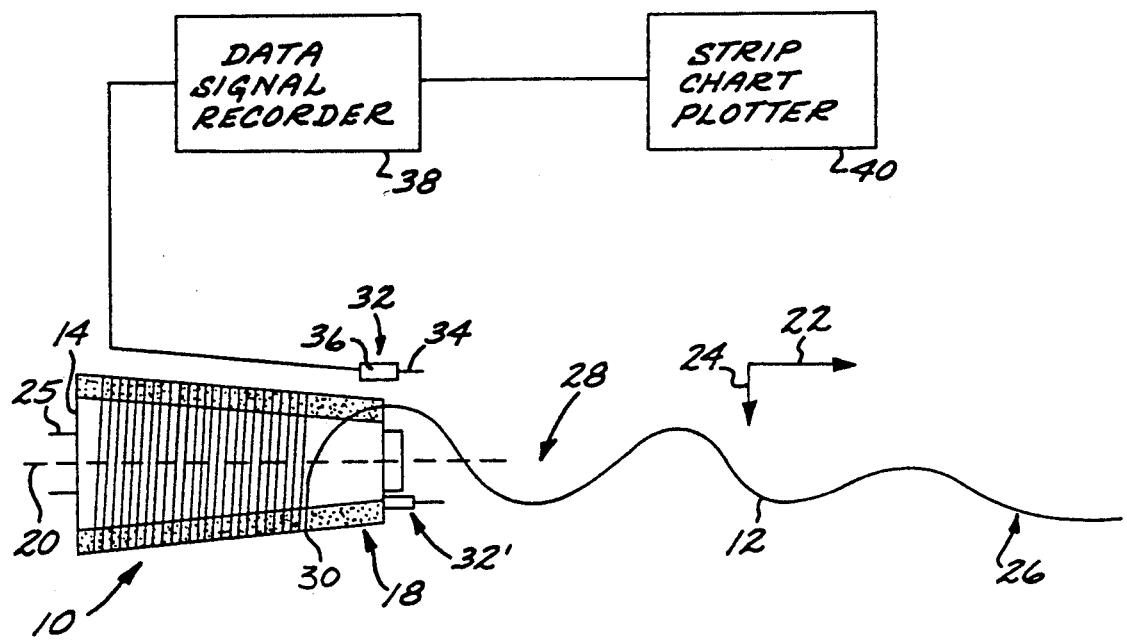
FIG. 1 is a diagrammatic side view of the payout of an optical fiber from a canister, the placement of an antenna to count turns, and associated instrumentation.
Figure 2:
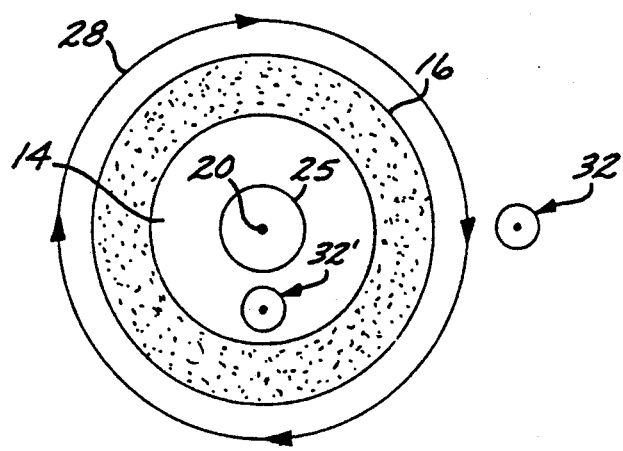
FIG. 2 is a diagrammatic end view of the payout of optical fiber.

FIGS. 1 and 2 illustrate a preferred apparatus 10 that is used to measure an optical fiber 12 during payout, to count the number of turns of optical fiber that are paid out. The optical fiber 12 is wound onto a bobbin 14, which may be considered a support for the optical fiber 12. There are a plurality of turns in each layer on the bobbin 14, and a plurality of layers overlying each other. Together, the turns and layers of optical fiber 12 are termed a fiber pack 16. The bobbin 14 and fiber pack 16 are collectively termed a canister 18.

The bobbin 14 has a generally cylindrical shape, but preferably has a slight taper from one end to the other of less than 5 degree, with the cylindrical diameter decreasing along that length. That is, the bobbin is preferably a truncated cone with a very small conical angle. The bobbin 14 and canister 18 can be described as having an axis 20 along the cylindrical or conical axis of the bobbin 14. When the optical fiber 12 is to be payed out or unwound from the canister 18, it is removed from the canister 18 in a payout direction 22 that is generally parallel to the axis 20, and from the end of the canister 18 with the smaller cylindrical diameter. The payout direction 22 is also termed the longitudinal direction, and any direction perpendicular to the payout direction is termed the transverse direction 24.

Payout is accomplished by pulling the optical fiber 12 from the canister 18 or, alternatively, holding a free end of the optical fiber stationary and moving the canister 18 away from the stationary end. In the preferred approach, the canister is mounted on a mandrel 25 that does not turn, but simply holds the canister in the proper attitude for payout. The canister 18 does not turn relative to the mandrel 25. At a large longitudinal distance from the canister 18, the optical fiber 12 therefore assumes a generally straight line, as indicated at numeral 26.

Closer to the canister 18, in a region longitudinally adjacent to the canister 18 and indicated by the numeral 28, the path of the optical fiber 12 is not a straight line. Instead, as illustrated in FIG. 1, there is a transverse component to the motion of the optical fiber 12. Alternatively stated, the optical fiber 12 follows a helical path as it pays out from the canister 18. The transverse component and helical path occur because the point 30 at which the optical fiber 12 is peeled from the fiber pack 16 moves around the circumference of the cylindrical or conical bobbin 14. The optical fiber 12 must therefore move radially or in the transverse direction 24 just after it is paid out, to reach the line defined in the region 26. (This motion and optical fiber path may be visualized as similar to that where a length of thread is pulled from a spool along the spool axis, producing a helical pattern near the spool.)

It has been determined that the optical fiber 12 carries a net electrical charge with it as it is paid out from the canister 18. The electrical charge may be either a free or bound electrical charge, and may be positive or negative. In any event the electric charge does not move any significant distance along the length of the optical fiber during the fraction of a second after payout that the optical fiber 12 follows a helical pattern in the longitudinally adjacent region 28, because of the short time and because the glass optical fiber is not a good conductor of electricity. The origin of the electric charge is not of concern to the operability of the present invention, and the fact of its presence is sufficient. It is believed that the electric charge arises, at least in part, because of the breaking of adhesive bonds at the peel point and the friction created during payout.

The electrical charge of the optical fiber produces an electromagnetic field in the neighborhood of the optical fiber as it moves. (The field is termed generally an "electromagnetic" field, even though the magnetic component may be small or zero, and is intended to encompass an electrostatic field.) The magnitude of the electromagnetic field generally falls inversely with some function of distance in the transverse direction from the optical fiber. Because of the helical pattern followed by the optical fiber, the functional variation is likely to be complex in nature, but the exact functional form is not important for the practice of the preferred embodiments of the invention. The magnitude of the electromagnetic field at the antenna 32 varies because the transverse distance from the antenna to the optical fiber undergoing helical motion varies.

According to the present invention, an electromagnetic field antenna 32 is mounted at a location transversely proximate to the longitudinally adjacent region 28. That is, the antenna 32 is mounted to the side of the region where the optical fiber 12 is moving in a helical pattern with a transverse component of motion. In the canister configuration of FIG. 1, the antenna is mounted just to the side of the canister 18 and near the end of the canister 18 from which the optical fiber 12 is paid out.

The antenna 32 is preferably a straight length of electrically conducting wire 34 that is oriented generally parallel to the payout direction 22. The wire 34 is mounted in a nonconducting holder 36. The antenna 32 senses the magnitude of the electromagnetic field at the antenna as an induced electric current signal in the antenna. The signal of the antenna is conducted to an amplifier and signal recorder 38, and then optionally may be displayed on an oscilloscope or strip chart plotter 40.

In one preferred embodiment, the antenna 32 includes a straight piece of 0.040 inch diameter, 2.0 inch long copper wire mounted in a BNC coaxial insulator holder with the long dimension of the antenna parallel to the axis of the bobbin. The amplifier and signal recorder is a model RTP 650A made by KYOWA Electronic Instruments Corp.

A number of variations on this basic approach are possible. One is to mount the antenna 32 at another transverse location, as on the end of the canister 18, as indicated by the antenna 32', or on the end of the mandrel 25. Mounting the antenna outside the outer diameter of the canister 18 is preferred, as this minimizes the chances of interference between the optical fiber and the antenna, and yields the largest variation in signal during measurements. The invention is operable with the antenna inside the envelope of the optical fiber, however. Another approach is to use an antenna shape other than a straight wire, such as a loop.

Another alternative is to place the recorder 38 and plotter 40 at the other end of the optical fiber 12, and to transmit the signal of the antenna 32, preamplified if necessary, through the optical fiber 12. Where the present invention is used in relation to optical fiber testing in a stationary facility, the antenna signal would be provided directly to the recorder 38 in the manner pictured. However, if the invention is used in conjunction with payout of the optical fiber from a canister in a moving vehicle where weight of the vehicle is critical, it could be preferably to mount the recorder 38 at the fixed end of the optical fiber 12 and to send the antenna signal through the optical fiber to the recorder 38.

One use of the present invention is to count the turns of the optical fiber 12 as they are payed out from the canister 18. The payout turn count is a direct indication of the rate of payout and of the total payout during a period, since the length of optical fiber payed out is a function of the number of turns times the length of optical fiber per turn. The length of optical fiber per turn is a function of the geometry of the canister, and is roughly equal to the local diameter of the turn prior to payout times the constant pi (3.14159 . . . ).

Figure 3:
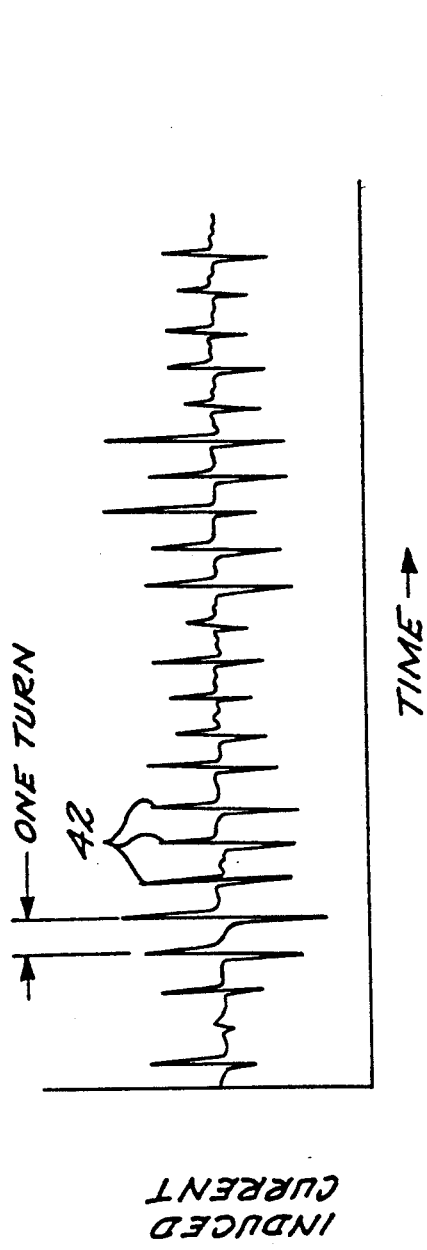
FIG. 3 is a measured graph of the induced current in the antenna as a function of time during payout of a few turns of the optical fiber.

FIG. 3 is a tracing of the output of a strip chart plotter 40, made during payout of the optical fiber 12 from the canister 18 at a rate of about 200 meters per second and using the preferred construction of the apparatus 10 as previously described. The figure exhibits a well defined periodic variation of the induced current of the antenna as a function of time. The maximum values such as at numeral 42 correspond to the point in the payout of the helix that the optical fiber is physically closest to the antenna, and the other values correspond to points where the optical fiber is further from the antenna.

Each of the maximum values 42 corresponds to the payout of one turn, and the time between occurrence of the maximum values corresponds to the time required for payout of one turn. As can be seen in FIG. 3, the peaks are clearly defined. The number of turns that are paid out is obtained by manually counting the number of peaks, or by using a conventional peak discriminating and counting electrical circuit. The clear definition of the peaks makes the counting quite easy.

An important feature of the present invention is that the ability to count the payout of turns is not sensitive to the exact placement of the antenna 32. The antenna can be moved to various locations, or even misoriented with respect to the canister, and sufficient information is still obtained to count the peaks. By comparison, optical methods that rely, for example, on the breaking, reflection, or refraction of a light beam by the optical fiber as it is paid out are highly sensitive to exact positioning and calibration, are sensitive to stray light and reflections, and also utilize more equipment. Optical methods are generally too cumbersome and inexact to use in field operations, even if they can be made to work in a laboratory. The present apparatus, in contrast, is rugged, light in weight, and tolerant of placement errors.

Figure 4:
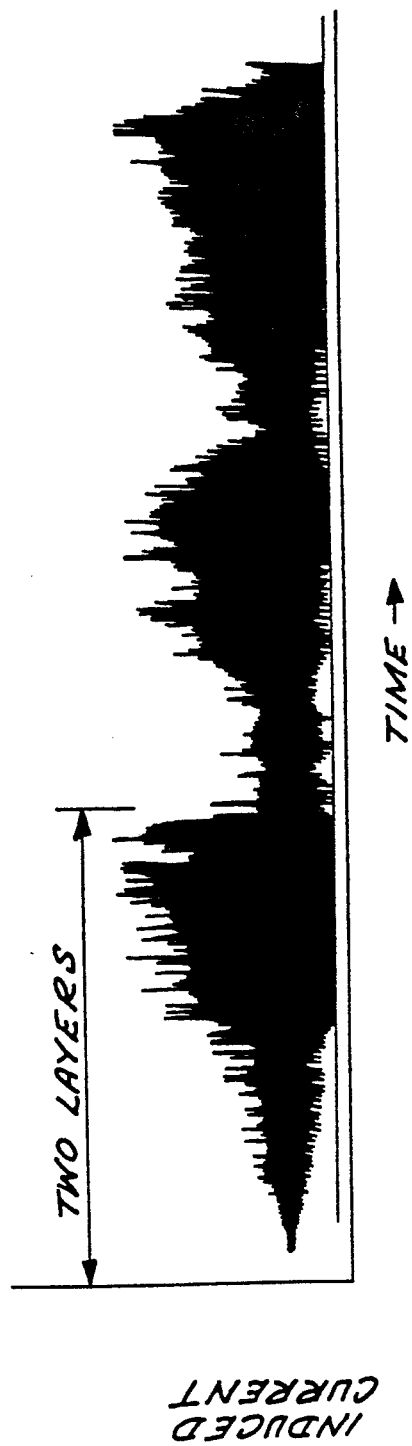
FIG. 4 is a measured graph of the induced current in the antenna as a function of time during payout of many turns of the optical fiber.

Another use of the invention is to measure and record the electromagnetic signature of the optical fiber during payout. FIG. 4 is a graph of the induced current signal measured by the antenna as a function of time, for the payout of six entire layers of the optical fiber. (FIG. 3, by comparison, may be viewed as an enlargement of a very small portion of FIG. 4.)

The form of FIG. 4 is not regular, but appears to exhibit a variation wherein some entire layers have a pattern different from other layers. It is believed that this variation relates to several factors, including the quality of the adhesive application. The signature of payout such as shown in FIG. 4 can be used to assess the uniformity of adhesive application to improve manufacturing operations.

Thus, the present invention provides a highly useful approach to monitoring characteristics of optical fibers as they are payed out from a support. Although particular embodiments of the invention have been described in detail for purposes of illustration, various modifications may be made without departing from the spirit and scope of the invention. Accordingly, the invention is not to be limited except as by the appended claims.

What is claimed is:

1. A process for measuring an optical fiber as the optical fiber is payed out from a support, comprising the steps of:
   providing a support having an optical fiber wound in turns thereupon;
   paying out the optical fiber from the support; and
   measuring the electromagnetic field produced by payout of the optical fiber.

2. The process of claim 1, wherein the optical fiber is payed out in a direction generally parallel to the longitudinal axis of the support.

3. The process of claim 1, wherein the step of measuring includes the step of detecting the electromagnetic field with an antenna positioned transversely proximate the optical fiber as the optical fiber is payed out in a generally helical pattern.

4. The process of claim 3, wherein payout of the optical fiber creates periodic variations in the electromagnetic field which are counted as a measure of the number of turns of optical fiber that are payed out from the support.

5. The process of claim 1, wherein the step of measuring includes the step of recording the payout signature of the optical fiber.

6. A process for measuring an optical fiber as it is payed out from a canister, comprising the steps of:
   providing a canister having an optical fiber pack wound thereupon, with the optical fiber paying out along a payout path so that the optical fiber follows a helical pattern having a transverse component of motion along a portion of the payout path and a longitudinal component of motion parallel to the longitudinal axis of the canister; and
   placing an electromagnetic field antenna transversely proximate the portion of the payout path where the optical fiber has the transverse component of motion, to detect changes in the electromagnetic field produced by payout of the optical fiber.

7. The process of claim 6, including the additional step, after the step of placing, of
   measuring the changes in the electromagnetic field as an indication of the number of turns of optical fiber that have been payed out from the canister.

8. The process of claim 6, including the additional step, after the step of placing, of
   measuring the signature of the optical fiber.

9. The process of claim 6, wherein the electromagnetic field antenna is a straight wire antenna disposed parallel to the longitudinal axis of the canister.

10. The process of claim 6, including the step of positioning the electomagnetic field antenna outside an envelope formed by helical movement of the optical fiber during payout from the canister.

11. The process of claim 6, including the step of positioning the electromagnetic field antenna inside an envelope formed by helical movement of the optical fiber during payout from the canister.

12. A process for counting the turns of an optical fiber payed out from a canister, comprising the steps of:
   providing a generally cylindrical canister having a plurality of turns of an optical fiber wound thereupon, wherein the optical fiber pays out from a payout end of the canister in a direction generally parallel to the longitudinal axis of the canister;
   placing an electromagnetic field antenna proximate the portion of the payout path where the optical fiber assumes a helical pattern during payout;
   paying out the optical fiber;
   measuring the electomagnetic signal detected in the electromagnetic field antenna during payout of the optical fiber; and
   counting the number of periodic fluctuations in the signal measured by the electromagnetic field antenna as the optical fiber is payed out, each fluctuation being associated with the payout of one turn of the optical fiber.

13. The process of claim 12, wherein the electromagnetic field antenna is a straight wire antenna extending parallel to the longitudinal axis of the canister.

14. The process of claim 12, including the step of positioning the electromagnetic field antenna inside an envelope formed by helical movement of the optical fiber during payout from the canister.

15. The process of claim 12, wherein the electromagnetic field antenna is mounted stationary inside the envelope of the helical pattern.

16. Apparatus for measuring an optical fiber during payout from an optical fiber canister, comprising:
   an electromagnetic field antenna spaced from and extending generally parallel to the longitudinal axis of the canister; and
   means for detecting periodic variations in an electromagnetic signal generated in the antenna during payout of the optical fiber.

17. The apparatus of claim 16, wherein the electromagnetic field antenna is a straight wire antenna extending parallel to the longitudinal axis of the canister.

18. The apparatus of claim 16, wherein the electromagnetic field antenna is mounted in a stationary location outside an envelope formed by the helical movement of the optical fiber during payout form the canister.

19. The apparatus of claim 16, wherein the electromagnetic field antenna is mounted in a stationary location inside an envelope formed by the helical movement of the optical fiber during payout form the canister.

* * * * *